United States Patent [19]

Riester et al.

[11] 4,380,860

[45] Apr. 26, 1983

[54] METHOD OF ASSEMBLING BEARING AND LEVER

[75] Inventors: William C. Riester, Williamsville; Dionysios D. Papadatos, Kenmore, both of N.Y.

[73] Assignee: Trico Products Corporation, Buffalo, N.Y.

[21] Appl. No.: 215,279

[22] Filed: Dec. 11, 1980

Related U.S. Application Data

[62] Division of Ser. No. 30,113, Apr. 16, 1979, Pat. No. 4,266,883.

[51] Int. Cl.³ ............................................. B23P 11/02
[52] U.S. Cl. .......................................... 29/453; 16/2; 72/377; 384/125; 384/203; 384/220
[58] Field of Search ................. 29/451, 453, 149.5 B, 29/526 R, 149.5 N, 149.5 M; 72/377; 16/2; 308/22, 26; 403/36, 71, 76, 122

[56] References Cited

U.S. PATENT DOCUMENTS

| | | | |
|---|---|---|---|
| 2,308,965 | 1/1943 | Riesing | 308/26 |
| 2,717,792 | 9/1955 | Pelley | 16/2 UX |
| 2,806,080 | 9/1957 | Corey | 16/2 UX |
| 2,901,144 | 8/1959 | Haustrup | 29/526 R UX |
| 3,227,001 | 1/1966 | Reese | 308/26 X |
| 3,243,835 | 4/1966 | Armentrout et al. | 16/2 |
| 3,316,033 | 4/1967 | Bila | 308/26 |
| 3,434,327 | 3/1969 | Speakman | 72/377 |
| 3,749,431 | 7/1973 | Eckhardt et al. | 403/122 |
| 3,749,431 | 7/1973 | Schmid et al. | 403/122 |
| 3,853,414 | 12/1974 | Hirano et al. | 403/122 X |
| 3,861,812 | 1/1975 | Ito | 403/71 |

FOREIGN PATENT DOCUMENTS 2335469  1/1975  Fed. Rep. of Germany ...... 403/134

*Primary Examiner*—Charlie T. Moon
*Attorney, Agent, or Firm*—E. Herbert Liss

[57] ABSTRACT

A socket of yieldable semi-rigid plastic material is formed with an external circumferential groove for receiving the periphery of an opening in a linkage member. The periphery of the opening is deformed out of the plane of the surface of the linkage to produce an effective thickness approximately the thickness of the groove, providing a method to assure a secure fit in cases where the thickness of the linkage material is either greater than or less than the width of the groove.

3 Claims, 5 Drawing Figures

U.S. Patent  Apr. 26, 1983  4,380,860
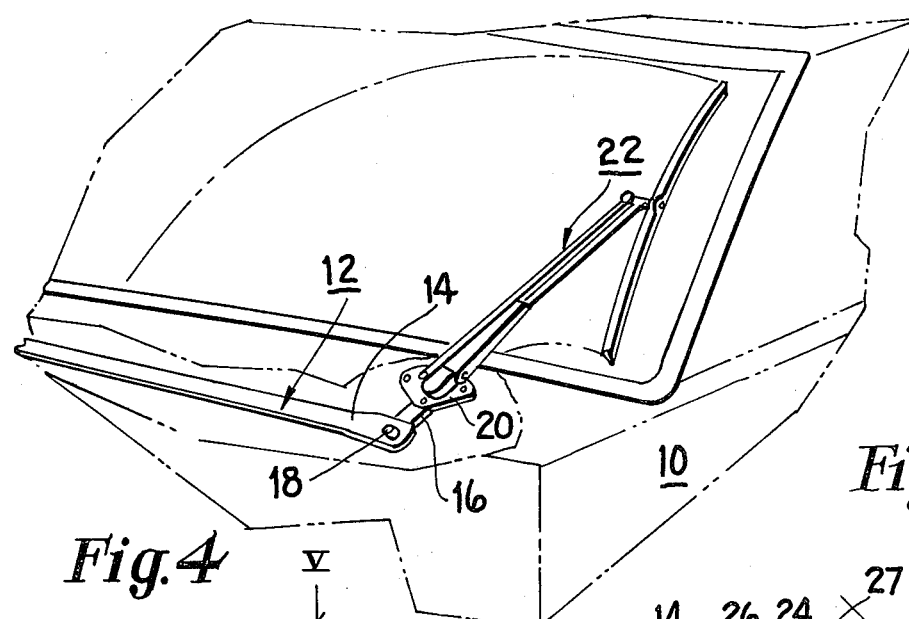
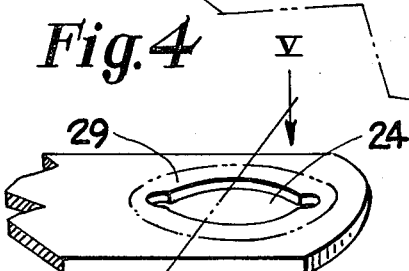
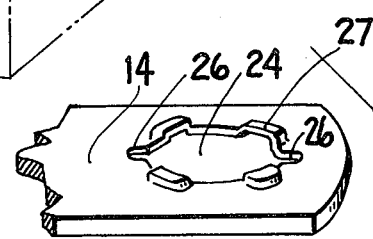
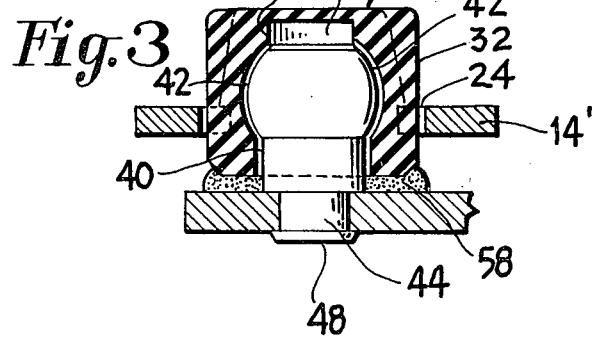
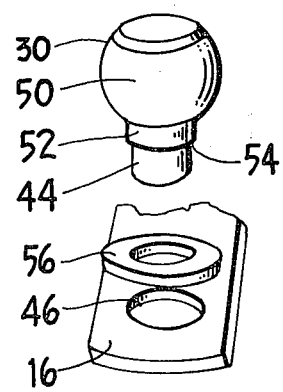
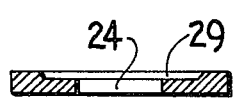

METHOD OF ASSEMBLING BEARING AND LEVER

This application is a division of co-pending application Ser. No. 30,113 filed Apr. 16, 1979, Now U.S. Pat. No. 4,266,883, issued May 12, 1981.

BACKGROUND OF THE INVENTION

The present invention relates to a method for assembling a plastic socket with a linkage lever.

In a linkage transmission assembly a multiplicity of lever members and joints are used. It is therefore advantageous for economy and simplicity of manufacture purposes to utilize a socket or bearing member of one size and design for the entire linkage system. This presents a problem because metals of different thicknesses are employed in the various lever members depending upon space and design requirements.

SUMMARY OF THE INVENTION

It is an object of the invention to provide an improved method of assembling a socket or bearing member to a lever which will effect a secure fit of the socket member or lever members of differing thicknesses.

Other objects and advantages of the invention will be apparent from the following detailed description taken in connection with the accompanying drawings.

BRIEF DESCRIPTION OF THE DRAWINGS

FIG. 1 is a partial perspective view of a motor vehicle showing a windshield wiper system linkage transmission assembly which incorporates the present invention;

FIG. 2 is an exploded perspective view of a transmission linkage bearing joint assembly;

FIG. 3 is a cross sectional view taken on line III—III of FIG. 2 showing a bearing joint assembly in assembled condition;

FIG. 4 is a fragmentary perspective view of a linkage lever having an aperture made in accordance with one form of the invention; and FIG. 5 is a sectional view taken on line V—V of FIG. 4.

DETAILED DESCRIPTION

Referring to the drawings in particular, FIG. 1 illustrates a motor vehicle 10 having a windshield wiper linkage transmission 12 including a connecting arm or first linkage or lever member 14, a crank arm or second linkage or lever member 16 and a ball joint 18 connecting the crank arm 16 and the connecting arm 14. A motor (not shown) drives the connecting arm 14 to oscillate a pivot shaft (not shown) mounted in a pivot body 20. A wiper arm and blade assembly 22 is secured to the pivot shaft for oscillation therewith.

In FIGS. 2 and 3 by way of example the components of a bearing assembly and specifically a ball joint bearing assembly 18 are illustrated. In FIG. 2 a linkage or lever member 14 is shown having an aperture 24 adjacent its ends with radially extending key slots 26 diametrically spaced from each other. On the periphery of the aperture 24 are formed circumferentially spaced deformations 27 for a purpose to be hereinafter described. A ball socket member 28 is shown for reception in the aperture 24 as shown in FIG. 3. The ball socket member may be of semi-rigid plastic material having a stress level which renders it yieldable to the pressure applied during insertion into the aperture 24; it is also yieldable to the forces applied during insertion of the ball stem member. However, the stress level is resistant to yielding from canting forces applied during operation of the wiper system. ZYTEL® ST 801 nylon resin manufactured by E. I. du Pont de Nemours & Co., Inc. and VALOX® 310 thermoplastic polyester manufactured by General Electric Co. are examples of materials having such characteristics. In accordance with the broader aspects of the invention other and different materials exhibiting similar properties as described may be employed.

The ball socket member 28 may include external ears 32 diametrically spaced from each other and positioned to interrupt a circumferential external groove 34 which interengages the periphery of the aperture 24 to retain the ball socket on the first linkage member 14. The deformations 27 are provided to approximate the width of groove 34 so that a secure, tight fit is achieved. The linkage member 14' shown in FIG. 3 does not require the deformations 27 since it is of a thickness substantially equal to the width of the groove 34. In the FIG. 4 embodiment the periphery of the aperture 24 is dished as at 29 to accomodate the groove 34 securely when the thickness of the linkage member 14 is greater than the width of the groove 34.

The ball socket 28 has an internal cylindrical recess 36, closed at one end, forming a lubricant socket; it terminates at its other end in a substantially spherical hollow portion 38 which in turn terminates in an open ended cylindrical portion 40 of smaller diameter than the diameter of the spherical portion 38. A pair of internal slots 42 in alignment with the ears 32 extend from the open end of the cylindrical recess 36 to the open end of the cylindrical recess 40 and serve as lubricant relief slots as well as lubricant distribution means. Location of the slots 42 in alignment with ears 32 permits the slots to be of an effective depth while maintaining the notched impact strength; this arrangement enhances resistance to fracturing during assembly and operation.

The second linkage member 16 has secured at an end thereof a ball stem or stud 30 comprising a cylindrical end portion 44 received in aperture 46 and peened over as at 48. The ball stem 30 includes a substantially spherical head 50 corresponding in size and shape to the spherical hollow portion 38 of the ball socket 28; it terminates in a cylindrical ball portion 52 corresponding to the cylindrical recess 36 and is of greater diameter than the stem 44 forming a shoulder 54 therebetween which seats on the periphery of the aperture 46. A seal 56 is provided which may be of polyurethane or any other suitable or desirable closed cell cellular material. The seal 56 encircles the base portion 52 and is retained by the ball 50.

A novel method of securing the ball socket 28 and in accordance with the broader aspects of the invention any bearing member of resilient material to the first linkage or lever member 14 comprises the steps of forming an aperture in the linkage member 14 and deforming the aperture as at 27 or 29 to obtain an effective thickness on the periphery of the aperture approximating the width of the groove 34 of the ball socket 28. As can be seen in FIG. 2, the outermost surfaces of the deformation 27 lie in a plane parallel to the peripheral surface of the aperture so as to maintain a constant aperture diameter. Thereafter the ball socket 28 is passed into the aperture 24 with the ears 32 in alignment with the key slots 26 and pressure is applied until the groove 34 engages the periphery of the aperture 24 whereupon it is securely retained in position. The ears 32 interrupt the groove 34 so as to serve as keys for retaining the ball socket against rotation and also to reinforce the axially slotted portion. The link 16 with the ball stem or stud 30 and the seal 56 attached is inserted through cylindrical opening 40 and pressure is applied until the cylindrical portion 50 of the ball 30 snaps into the spherical hollow portion 38 of the ball socket 28. Sufficient pressure is applied to cause yielding of the ball socket member 28 so as to permit entry of the ball stud into the spherical socket. The axial slots 42 form a relief path for expulsion of excessive grease which would otherwise be entrapped and thus be likely to cause fracturing of the socket member body. The stresses resulting are below the threshold at which the ball socket is likely to fracture. When the ball stem 30 is seated in the socket member 28 the periphery 58 of the open end of the ball socket 28 will seat on the seal 56 compressing it slightly. While driving the ball stud 30 into the hollow of the ball socket 28 any excess lubricant within the ball socket will be expelled through the slots 42 and absorbed by the seal 56. Compressing the seal 56 serves to obviate the entry of contaminants into the hollow. The urethane seal 56 being resilient permits canting of the linkage members relative to each other.

In cases where the groove 34 is of smaller width than the thickness of the linkage, as shown in FIG. 4, a peripheral depression or dished periphery is formed having a greater diameter than the diameter of the upper shoulder of the slot 34 resulting in a peripheral edge of a width approximately the width of the groove 34 thereby effecting a secure, tight fit of the ball socket 28 in the aperture 24. If the thickness of the linkage is equivalent to the thickness of the groove 34 the peripheral forming operation may be deleted.

A unique method of assembly which permits use of a one shape and size socket bearing member for linkage members of different thicknesses has been shown and described for the purposes of illustration. It will, of course, be understood, however, that other types of resilient bearings as well as grommets which include a circumferential groove may be utilized in accordance with the broader aspects of the invention and that the peripheral deformation about the aperture and linkage may be varied in shape and size. Therefore, although certain specific embodiments of the invention have been shown and described for the purpose of illustration it will of course be understood that other embodiments and modifications which come within the scope of the invention may be employed.

What is claimed is:

1. A method of assembling a unitary, semi-rigid, yieldable bearing member having a circumferential external groove in secure interengagement with a flat linkage member of a thickness less than the width of said groove comprising the steps of forming an aperture in the linkage member, deforming the periphery of the aperture out of the original surface plane thereof but parallel to said plane while maintaining a constant aperture diameter to increase the effective thickness of the periphery of the aperture of the linkage member to approximate the width of the groove while the circumferential surface of the aperture remains facing radially into the aperture, inserting the resilient bearing member into the aperture; applying a force to the resilient bearing member in a direction through the aperture until the groove in the bearing member snap-fits into and engages the periphery of the aperture.

2. A method of assembling a bearing member having a circumferential external groove in secure interengagement with a linkage member according to claim 1 comprising deforming the periphery of the aperture out of the original surface plane thereof but parallel to the plane at circumferentially spaced areas to increase the effective thickness and maintain a constant aperture diameter of the periphery of the aperture of the linkage member to approximate the width of the groove.

3. A method of assembling a bearing member having a circumferential external groove and a radially extending ear interrupting the groove in secure interengagement with a linkage member according to any of claims 1, or 2 wherein the aperture is formed with a radially extending portion to accomodate the radially extending ear.

* * * * *